United States Patent
Shingai

(10) Patent No.: US 7,675,661 B2
(45) Date of Patent: Mar. 9, 2010

(54) PRINTING BASED ON MOTION PICTURE

(75) Inventor: Kosuke Shingai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 832 days.

(21) Appl. No.: 11/347,837

(22) Filed: Feb. 2, 2006

(65) Prior Publication Data

US 2007/0003222 A1    Jan. 4, 2007

(30) Foreign Application Priority Data

Feb. 4, 2005    (JP)    ............................. 2005-029387

(51) Int. Cl.
*H04N 1/46* (2006.01)

(52) U.S. Cl. ...................... 358/527; 358/1.9; 358/528; 358/538; 386/8; 386/35; 386/38; 386/95; 348/14.14; 348/14.15; 715/719; 715/720; 715/721; 715/723; 715/727

(58) Field of Classification Search ................ 358/1.9, 358/527; 386/95
See application file for complete search history.

(56) References Cited

U.S. PATENT DOCUMENTS

| | | | |
|---|---|---|---|
| 5,257,332 A | 10/1993 | Pimpinella | |
| 6,011,662 A | 1/2000 | Evans | |
| 6,702,446 B2 | 3/2004 | De Vaan et al. | |
| 6,715,887 B2 | 4/2004 | Chang | |
| 6,813,087 B2 | 11/2004 | Davis | |
| 2001/0017714 A1 * | 8/2001 | Komatsu et al. | ............ 358/1.16 |
| 2002/0105729 A1 | 8/2002 | Richards et al. | |
| 2003/0095785 A1 * | 5/2003 | Izumi | ........................ 386/46 |
| 2003/0142241 A1 | 7/2003 | Allen et al. | |
| 2003/0184658 A1 * | 10/2003 | Fredlund et al. | ......... 348/220.1 |

(Continued)

FOREIGN PATENT DOCUMENTS

JP    A 3-122903    5/1991

(Continued)

OTHER PUBLICATIONS

Abstract of Japanese Patent Publication No. 09-130591, Pub. Date: May 16, 1997, Patent Abstracts of Japan.

(Continued)

*Primary Examiner*—Mark K Zimmerman
*Assistant Examiner*—Miya J Cato
(74) *Attorney, Agent, or Firm*—Martine Penilla & Gencarella, LLP

(57) ABSTRACT

A technology is provided by which images can be specified in a moving picture and printed easily. First, a plurality of first still images are displayed on a display unit based on a plurality of images which are to be displayed at mutually differing times in a single moving picture. After receiving from a user a selection of a first still image from among the plurality of first still images, the moving picture is played on the display unit for a first time segment which is shorter than a playback time of the moving picture and includes a time at which the selected first still image is to be displayed. Then, according to an instruction by the user which is given during the playback of the moving picture, a second still image is displayed on the display unit based on an image which is to be displayed in the moving picture. The second still image is printed.

6 Claims, 10 Drawing Sheets

U.S. PATENT DOCUMENTS

| | | | |
|---|---|---|---|
| 2003/0231862 A1 * | 12/2003 | Kawaoka | 386/52 |
| 2004/0095767 A1 | 5/2004 | Ohmae et al. | |
| 2005/0018145 A1 | 1/2005 | Kwon et al. | |
| 2005/0185158 A1 * | 8/2005 | Matsuhira | 355/40 |

FOREIGN PATENT DOCUMENTS

| | | |
|---|---|---|
| JP | A 5-90391 | 4/1993 |
| JP | A 6-347639 | 12/1994 |
| JP | 09-130591 | 5/1997 |
| JP | A 10-48542 | 2/1998 |
| JP | A 11-115711 | 4/1999 |
| JP | A 11-222664 | 8/1999 |
| JP | 2000-118081 | 4/2000 |
| JP | A 2000-239830 | 9/2000 |
| JP | 2001-054607 | 2/2001 |
| JP | A 2001-73136 | 3/2001 |
| JP | 2001-103420 | 4/2001 |
| JP | 2002-112169 | 4/2002 |
| JP | A 2003-2003-50309 | 2/2003 |
| JP | A 2003-57424 | 2/2003 |
| JP | 2004-064231 | 2/2004 |
| JP | 2004-101827 | 4/2004 |
| WO | WO 94/25796 | 11/1994 |

OTHER PUBLICATIONS

Abstract of Japanese Patent Publication No. 2000-118081, Pub. Date: Apr. 25, 2000, Patent Abstracts of Japan.
Abstract of Japanese Patent Publication No. 2001-054607, Pub. Date: Feb. 27, 2001, Patent Abstracts of Japan.
Abstract of Japanese Patent Publication No. 2001-103420, Pub. Date: Apr. 13, 2001, Patent Abstracts of Japan.
Abstract of Japanese Patent Publication No. 2002-112169, Pub. Date: Apr. 12, 2002, Patent Abstracts of Japan.
Abstract of Japanese Patent Publication No. 2004-064231, Pub. Date: Feb. 26, 2004, Patent Abstracts of Japan.

* cited by examiner

PRINTING BASED ON MOTION PICTURE

BACKGROUND OF THE INVENTION

1. Field of the Invention

The present invention relates to technologies that perform printing of images based on a moving picture.

2. Description of the Related Art

Conventionally, printing devices have been developed which can perform printing based on image data, without using a computer.

This type of printing device is provided with a slot that reads media on which the image data is recorded, and with a small display. The user inserts, into a slot, media on which still image data is recorded, and can select and print the desired still image data by operating buttons based on the content of the display.

However, in this conventional printing device, no thought has been given to specifying easily an image from within a moving picture when printing a desired still image from moving picture data.

The present invention was created in order to address the issue described above, and the object thereof is to provide a technology by which to enable the easy specification and printing of images from within a moving picture in a printing device.

The present invention is related to Japanese Patent Application Number 2005-29387, filed Feb. 4, 2005; the contents of are incorporated herein by reference.

SUMMARY OF THE INVENTION

In order to address the aforementioned object, the present invention includes a structure as described below in a printing apparatus for printing a still image based on a moving picture. The printing apparatus is equipped a display unit for displaying an image, a representative still image display unit, a movie playback unit, a confirmation still image display unit, and a printing unit. The representative still image display unit displays a plurality of first still images on the display unit based on a plurality of images which are to be displayed at mutually differing times in a single moving picture. The movie playback unit receives from a user a selection of one first still image from among the plurality of first still images and plays the moving picture on the display unit for a first time segment. The first time segment is shorter than a playback time of the moving picture and includes a time at which the selected first still image is to be displayed. The confirmation still image display unit displays, according to an instruction by the user which is given during the playback of the moving picture, a second still image on the display unit based on an image which is to be displayed in the moving picture. The printing unit prints the second still image.

Such an aspect enables the user to specify the desired still image that is displayed within a moving picture, without playing the entire moving picture. Accordingly, images can be specified in a moving picture and printed easily.

It is preferable that the plurality of images includes images which are to be displayed at mutually identical time intervals within the moving picture. In such an aspect, images which are to be displayed at the specified points in time within the moving picture, without the variation of thickness in the playback time, can be displayed as a still image. Consequently, this makes it possible to reduce the probability that the user misses seeing a part of the images when selecting the image to print.

It is preferable that the moving picture is played more largely than each of the first still images on the display unit. With such an aspect, the user can specify a still image to print after watching the moving picture which is displayed in an expanded view and played back, and confirming fine changes in the image composition.

It is preferable that the second still image is displayed more largely than each of the first still images on the display unit. With such an aspect, the user can print after confirming the fine image composition in the second still image which is displayed in an expanded view.

The second still image is preferably determined as follows. A plurality of candidate images are determined based on an instruction time at which the instruction is given by the user. The plurality of candidate images are to be displayed in the moving picture at times which are included within a second time segment which is shorter than the first time segment. Candidate images are selected based on image quality from among the plurality of candidate images. Then the second still image is displayed based on the selected candidate images. Such an aspect enables a high quality image to be selected in advance and displayed to the display unit as the second still image.

The second still image preferably is determined as described below. A first set of a plurality of candidate images and a second set of a plurality of candidate images are determined. The first set of a plurality of candidate images are each to be displayed in a second time segment which is shorter than the first time segment and includes an instruction time at which the instruction was given. The second set of a plurality of candidate images are each to be displayed in a third time segment which is shorter than the first time segment and includes a time prior to the instruction time. Candidate images are selected based on image quality from among the first set and second set of candidate images. Then a plurality of still images which include a still image as the second still image are displayed based on the selected candidate images. After receiving from the user a selection of one still image from among the plurality of still images, the one selected still image as the second still image is printed. Such an aspect enables the user to select and print a desired composition image from among high quality images.

It is preferable that, after receiving from the user an specification of a reference time interval, an interval between the second and third time segments is determined based on the reference time interval. Such an aspect enables the application of user preferences, when selecting a still image to be printed, as to whether to select a still image to be printed from still images with extremely small differences from each other, having display times that are near to each other within the moving picture, or whether to select still images to be printed from still images that have large differences in composition, having display times that are far from each other.

Note that the present invention can be embodied in a variety of forms. The present invention can be embodied, for example, as a printing method and printing apparatus, as a printing control method and printing control apparatus, as a method of specifying an image within a moving picture, as a device for specifying an image within a moving picture, as a computer program for achieving the functions of the methods and devices, as a recording medium upon which such a computer program is recorded, as a data signal that is carried within a carrier wave and that includes this computer program, and so forth.

These and other objects, features, aspects, and advantages of the present invention will become more apparent from the following detailed description of the preferred embodiments with the accompanying drawings.

A. FIRST EMBODIMENT

Figure 1:
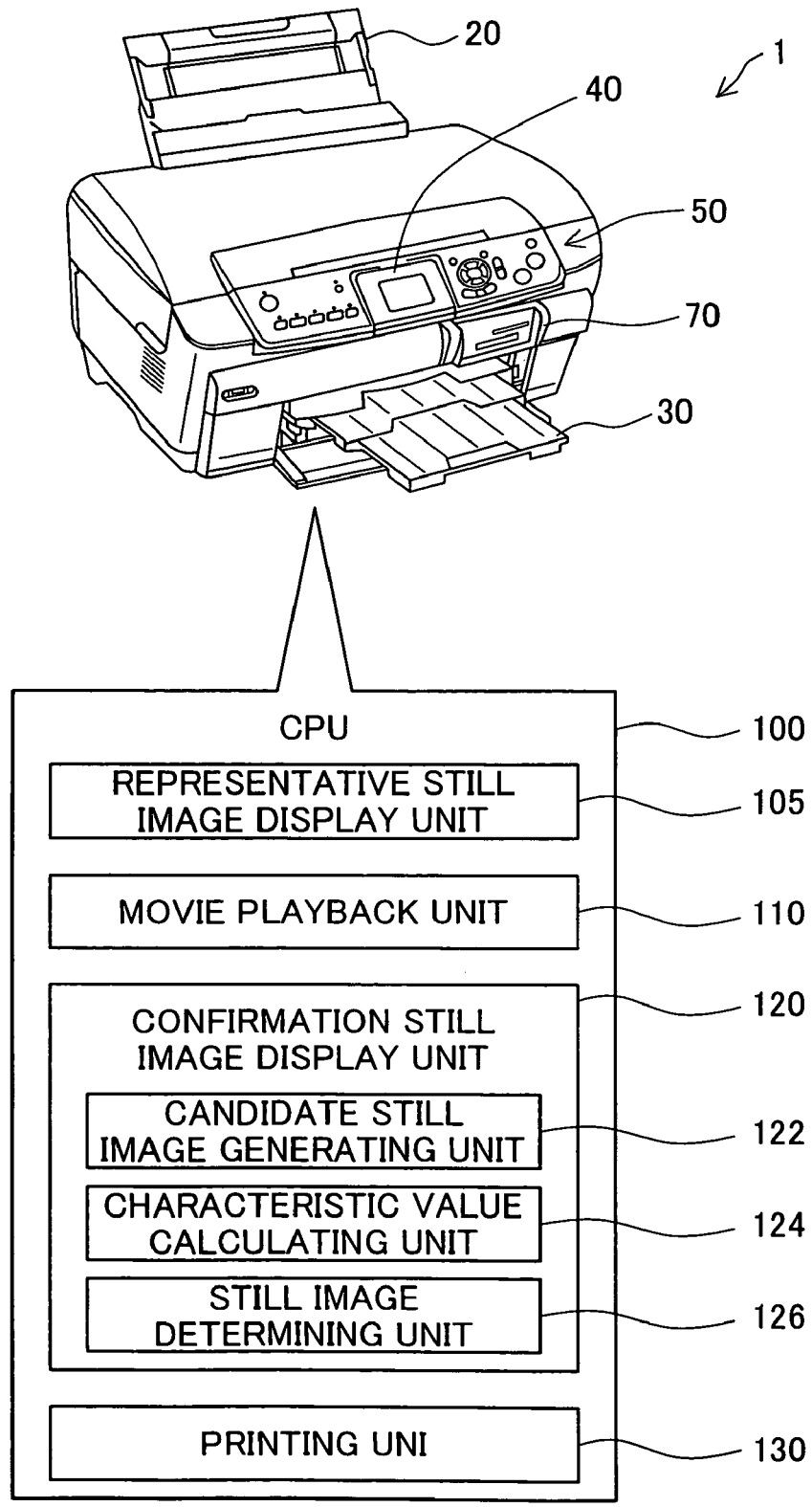
FIG. 1 is a perspective view illustrating a printer that is an embodiment according to the present invention.

FIG. 1 is a perspective view illustrating a printer 1 that is an embodiment according to the present invention. The printer 1 is not connected to an external computer, but rather is a printer that can print still images by itself based on a moving picture data file that is stored on a memory medium. This printer 1 is provided with a print head (not shown) for printing by ejecting ink droplets, an automatic sheet feeder 20 for feeding printer paper, an ejected paper tray 30 for receiving the printer paper upon which the images have been printed, a liquid crystal display 40, a set of buttons 50 for issuing various types of instructions, a card slot 70 into which memory cards are inserted for reading data, and a CPU 100. Note that in FIG. 1 the CPU 100 and the functional units thereof are shown as outside of the printer 1 in order to make the explanation more easily understood.

Figure 2:
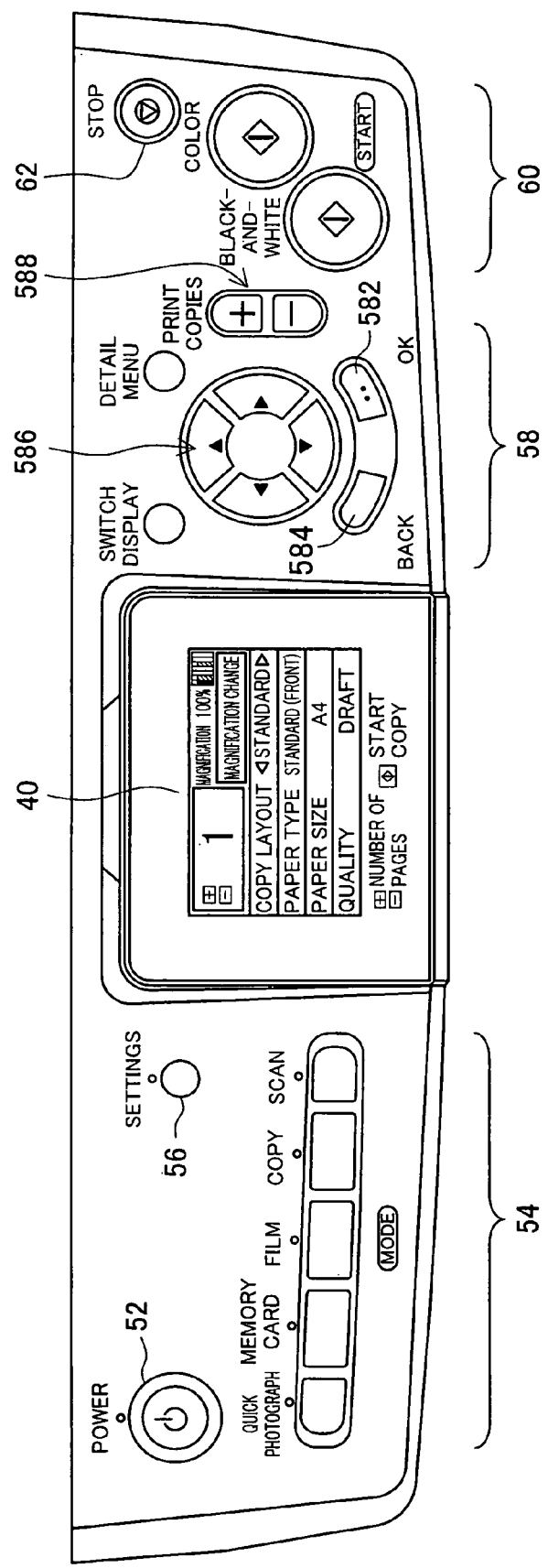
FIG. 2 is a plan view illustrating an enlarged view of the operating panel equipped with the liquid crystal display 40 and the set of buttons 50.

FIG. 2 is a plan view illustrating an enlargement of an operating panel equipped with the liquid crystal display 40 and the set of buttons 50. The 2.5-inch liquid crystal display 40 is provided in the center of the operating panel. The liquid crystal display 40 can display color images.

On both sides of the liquid crystal display 40 are provided buttons 52-62 for issuing a variety of instructions. These buttons 52-62 are together termed the "set of buttons 50." A power supply button 52 is a button for turning ON and OFF the power supply for the printer 1. A set of mode buttons 54 is a plurality of buttons by which the user can switch the operating modes of the printer. There is a one-to-one correspondence between modes and buttons. A setup button 56 is a button that is pushed when performing various types of maintenance on the printer 1 or for setting up each of the operating modes.

A set of menu buttons 58 is a plurality of buttons for operating various types of quantitative values and icons displayed on the liquid crystal display 40. A set of start buttons 60 is two buttons for selecting whether to perform color printing or to perform monochrome printing. There is one button for color printing and one button for monochrome printing. A stop button 62 is a button for stopping the operation being executed by the printer 1.

The set of menu buttons 58 includes an OK button 582 for inputting approval of the contents of the settings displayed on the liquid crystal display 40, a BACK button 584 for returning to displaying the content that was displayed in the previous step on the liquid crystal display 40, a set of select buttons 586, having four buttons for selecting one of a plurality of icons or menus displayed on the liquid crystal display 40 and a set of print count specification buttons 588 for setting the number of copies to be printed. The provision of this type of set of buttons makes it possible to select and print easily an image that is stored on a memory card, even if the printer 1 is equipped with only a relatively small display.

Figure 3:
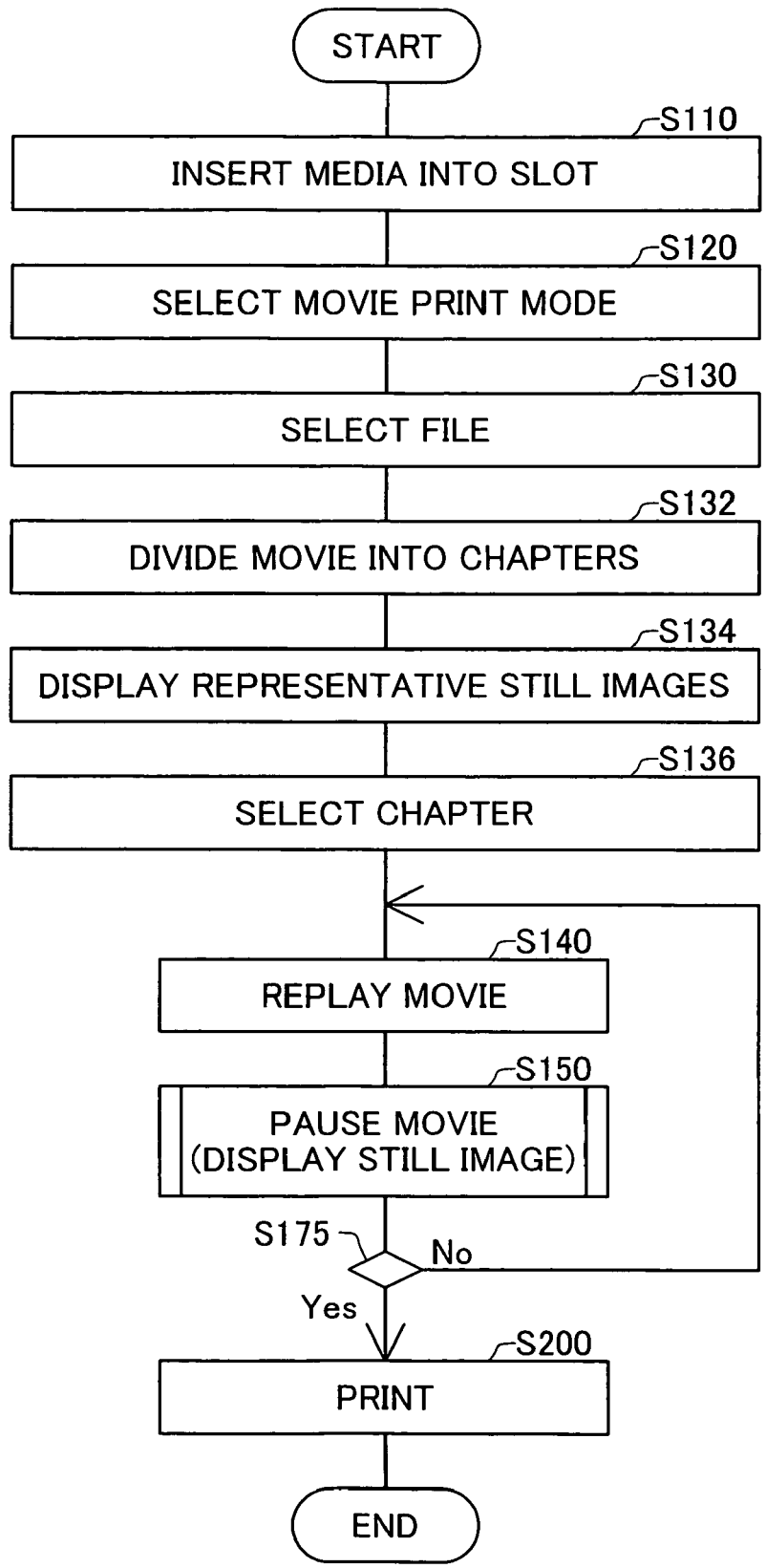
FIG. 3 is a flow chart illustrating the sequence when printing a still image for a moving picture data file stored on a memory card.

FIG. 3 is a flow chart illustrating the processing when printing a still image based on a moving picture data file stored on a memory card. In step S110, the user inserts, into a card slot 70, a memory card on which a moving picture data file. Then, in step S120, a memory card button, from among the set of mode buttons 54, is pressed (in FIG. 2), to select "Print From Memory Card mode." After this, the set of select buttons 586 is further operated to select the "VdeoMovie Print mode" menu for printing from a moving picture, from among the menus displayed on the liquid crystal display 40, and the OK button 582 is used for confirmation. When this is done, the printer 1 enters the Movie Print mode.

When the printer 1 is put into the Movie Print mode, in the Print From Memory Card mode, the plurality of moving picture data files stored on the memory card are displayed on the liquid crystal display 40. In step S130 the user operates the set of select buttons 586 to select a moving picture data file, which will be the subject for performing printing, from among this plurality of moving picture data files.

Figure 4:
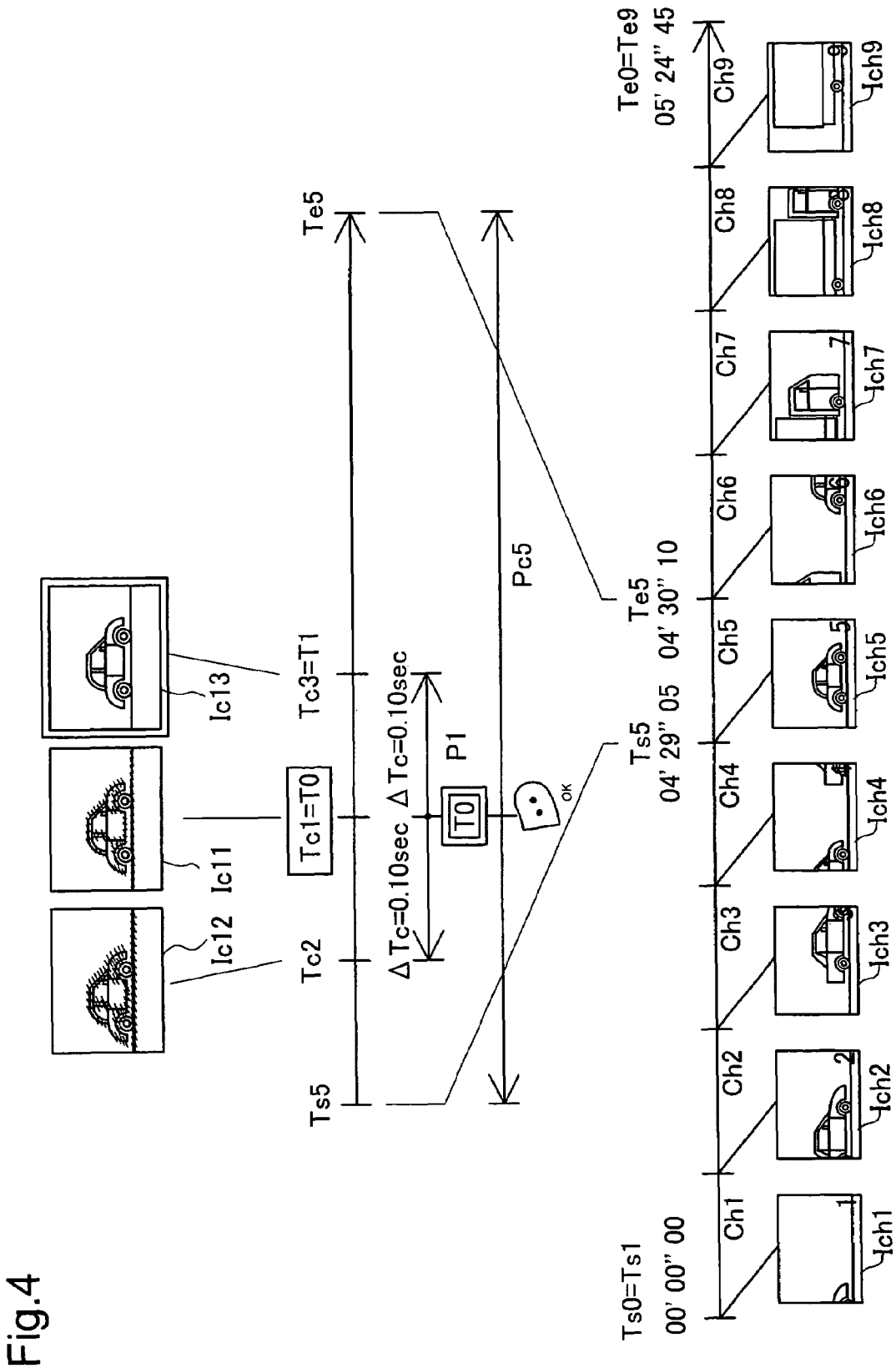
FIG. 4 is an explanatory diagram illustrating the relationship between each image displayed within the moving picture.

FIG. 4 is an explanatory diagram illustrating the relationships of the various images shown in the moving picture. At the bottom of FIG. 4 there is a line segment from the time Ts0 (0:0.00) (indicating 0 minutes and 0.00 seconds) through Te0 (5:24.45), which is the time interval required for the playback of a moving picture. In step S132, of FIG. 3, the CPU 100 reads out the selected moving picture data file and divides the moving picture into nine chapters Ch1 through Ch9 according to the time when playing back the moving picture. In the first embodiment, the division is performed so that each chapter will have an equal playback time. Note that the units for the minimum time units that can be processed in step S132 are allocated sequentially beginning with the first chapter Ch1. The playback time for the moving picture is stored as data in the moving picture data file.

The time required for playing back the entire moving picture is termed the "moving picture playback time." The time required for playing back an entire chapter in the moving picture is termed the "chapter playback time."

Figure 5:
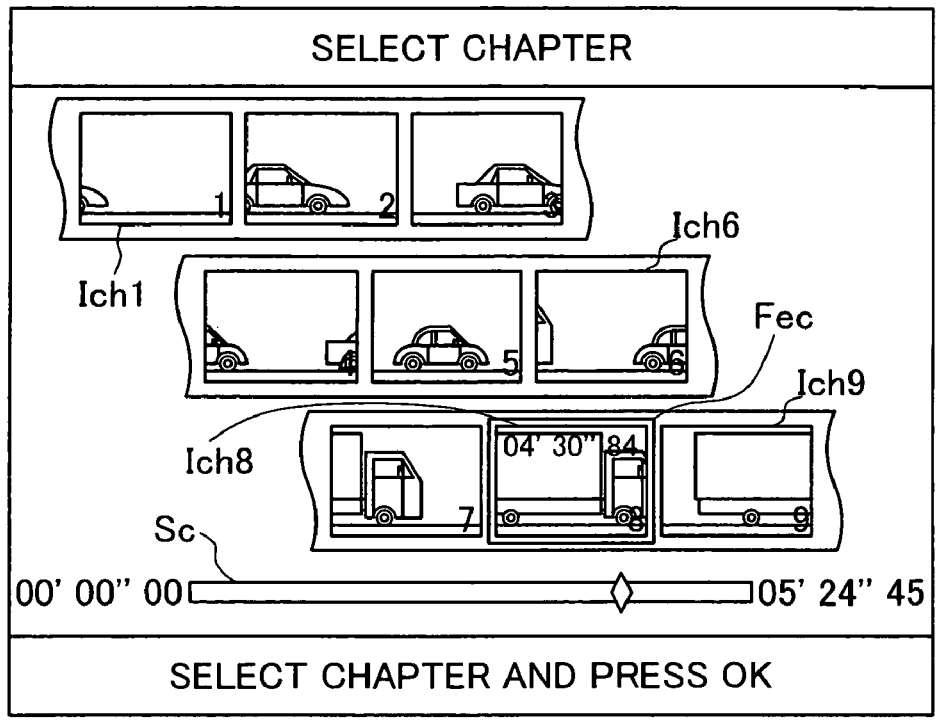
FIG. 5 is a diagram illustrating the display of the liquid crystal display 40 when displaying rough still images corresponding to each chapter.

FIG. 5 is a diagram illustrating the display on the liquid crystal display 40 when displaying still images corresponding to each of the chapters. In step S134 in FIG. 3, the CPU 100 displays representative still images Ich1 through Ich9 to the liquid crystal display 40 based on the image that is displayed first in each of the chapters Ch1 through Ch9 in the moving picture. In FIG. 5, representative still images Ich1 through Ich9 are displayed sequentially from the upper left to the lower right. Because the playback time is the same for each of the chapters, these representative still images Ich1 through Ich9 are images that are shown at equal time intervals within the moving picture (See the bottom of FIG. 4).

The representative still images Ich1 through Ich9 are not displayed in step S134 using, without modification, the number of pixels as in the moving picture recorded in the moving picture data file on the memory card, but rather are displayed after compression to a specific number of pixels. In other words, the number of pixels is reduced for the display unit. Note that the function for displaying the representative still images for each of the chapters in this way is achieved by a representative still image display unit 105 as a functional unit of the CPU 100. The representative still image display unit 105 is shown in FIG. 1.

Still images that have mutually differing numbers of pixels, generated based on an image that is displayed in the moving picture are considered as being the same still image, but with a different number of pixels. Consequently, the term "a particular still image is displayed" includes the case wherein the still image is displayed with a different number of pixels through enlarging or reducing the still image. Similarly, when there is a reference to printing a particular still image, this includes printing the still image with a different number of pixels by enlarging or reducing the still image.

Moreover, when an image displayed within a moving picture at a particular time, which is the target time for displaying a still image, is not the image by the frame in which the signal for each pixel is coded as it is, the CPU 100 may perform a process such as described below. That is, the CPU 100 may generate a still image based on the frame for the image at that time and on previous and subsequent frames to display the still image at the specific time. Furthermore, the CPU 100 may select the frame with a time nearest to the specified time in which the signals for each of the pixels is encoded, and may display this frame as the still image. An I frame in MPEG, for example, is a frame wherein the signals for each of the pixels are encoded directly. Moreover, the P frame in MPEG when using forward predictive encoding or the B frame in MPEG when using bi-directional predictive encoding are frames in which the signals for each of the pixels are not encoded directly.

In Step 136 in FIG. 3 the user selects a still image from the screen on the liquid crystal display 40, shown in FIG. 5, through operating the set of select buttons 586. The OK button 582 is pressed to confirm the selection. The still image that is selected provisionally through operating the set of select buttons 586 is displayed enclosed within a frame Fec. In the still image that has been selected provisionally, a time interval Ts is displayed. The time Ts is a time that would elapse from the beginning of playback when the still image is displayed in the moving picture being played back in real-time. Additionally, at the bottom of the screen on the liquid crystal display 40 there is a time scale Sc where an indicator displays a position that corresponds to the time Ts.

In the example in FIG. 5, the representative still image Ich8, which is displayed at the beginning of the 8th chapter Ch8, is selected. After this, "4:30.84", which is the time at which the representative still image Ich8 would be displayed, is displayed over the representative still image Ich8. The indicator on the time scale Sc displays a position that corresponds to four minutes and 30.84 seconds.

In the present specification, "playing back a moving picture in real-time" means playing back the moving picture at a pace that is the same pace as the pace with which time advanced when the moving picture was recorded. In the present specification, the display time for each of the images displayed in the moving picture indicates the time that elapses from the beginning of playback when the moving picture is displayed in real-time.

Figure 6:
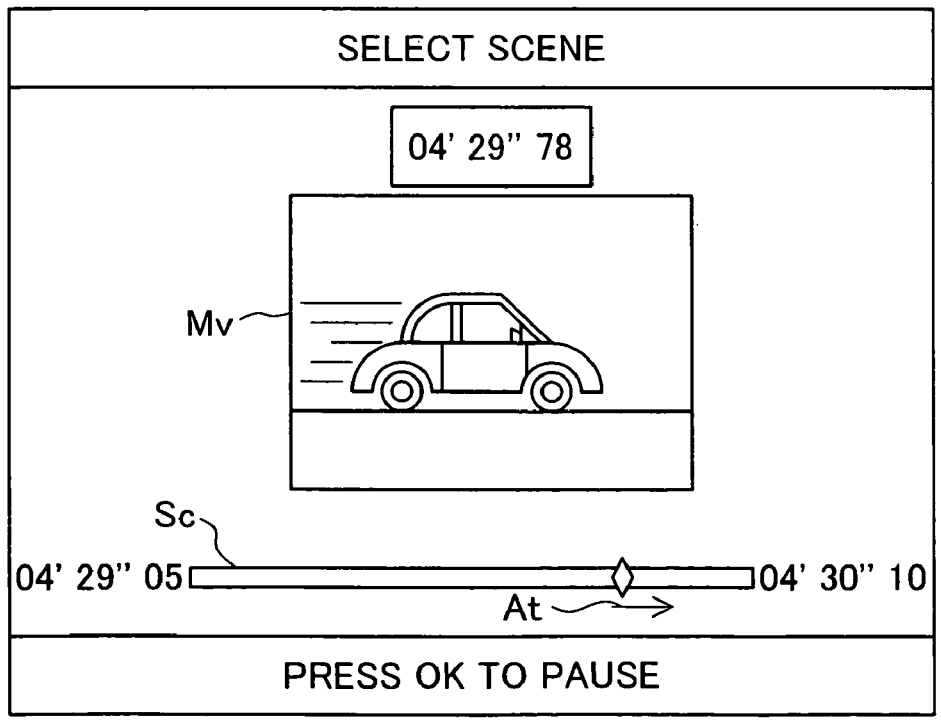
FIG. 6 is a diagram illustrating the state wherein a moving picture is played back on the liquid crystal display 40.

FIG. 6 is a diagram illustrating the state wherein the moving picture is played on the liquid crystal display 40. In step S140 in FIG. 3, the moving picture is played automatically on the liquid crystal display 40 for the chapter of the still image selected in step S136. Here it is assumed that the fifth chapter Ch5, or in other words, the still image Ich5, was selected (See the center in the bottom of FIG. 4). Note that the playback of the moving picture in step S140 may be performed automatically, or may be performed through the pushing of a specific button (for example, the right-facing button in the set of select buttons 586). The functions that play the moving picture in this way are achieved by the movie playback unit 110 as a functional unit of the CPU 100. The movie playback unit 110 is shown in FIG. 1.

The moving picture Mv that is played back in step S140 is not displayed with the same number of pixels as the moving picture that is recorded in the moving picture data file on the memory card, but rather is played after compression to a specific number of pixels. In other words, the number of pixels is reduced for the display unit. Doing this makes it possible to use a liquid crystal display that is small enough to mount on the printer, enabling the user to know the content of the moving picture that is stored in the moving picture data file.

Moreover, in step S140, the moving picture Mv is played more largely than each of the representative still images Ich1 through Ich9 that were displayed in step S134 on the liquid crystal display 40 (See FIG. 5 and FIG. 6). In other words, in step S140, the moving picture Mv is played on the liquid crystal display 40 using a number of pixels that is larger than the number of pixels for each of the representative still images Ich1 through Ich9 in step S134. Through this, the user is able to realize visually small changes in the images in the moving picture.

A time scale Sc is displayed at the bottom of FIG. 6. As the moving picture Mv is played back, the indicator on the time scale Sc moves from left to right, as shown by the arrow At. The start time and end time of the selected chapter within the moving picture are shown on the ends of the scale. Here the selected chapter Ch5 starts at time Ts5 (4:29.05) and ends at time Te5 (4:30.10). Similarly, the start times for each of the chapters are notated as Tsi (i=1-9) and the end times of each of the chapters are notated as Tei (i=1-9). The "i" here indicates the chapter number.

At the top of FIG. 6 there is a display of time that indicates how much time would elapse from the beginning of playback, if the moving picture were played back in real-time, until the scene that is currently displayed would be displayed. The scene that is displayed in the middle of FIG. 6 is the scene that would be displayed after 4 minutes and 29.78 seconds after the beginning of playback if the moving picture were played back in real-time.

The moving picture Mv in FIG. 6 is, as a rule, displayed in real-time. However, if, while the moving picture Mv is being played back, the right-facing button in the set of select buttons 586 is pressed, then the moving picture is played back at a speed that is faster than the normal playback speed (i.e., fast forward) as long as the button is pressed. Furthermore, if, while the moving picture Mv is being played back, the left-facing button in the set of select buttons 586 is pressed, then the playback will progress in the direction that is opposite of the normal direction as long as the button remains pressed, and the playback will be at a speed that is faster than the normal speed of playback (i.e., rewind). Moreover, if, while the moving picture Mv is being played back, the upwards-facing button in the set of select buttons 586 is pressed, then playback will be performed at a speed that is even faster than for the left-facing button, as long as the button remains pressed. Furthermore, if, while the moving picture Mv is being played back, the downward-facing button in the set of select buttons 586 is pressed, then the playback will progress in the reverse direction even faster than when the left-facing button is pressed, as long as the button is pressed. Such a configuration enables the user to arrive quickly and easily at a scene at any given playback time within the moving picture.

In step S150 in FIG. 3 the user presses the OK button 582 at the moment that the scene within the moving picture Mv the user wishes to print is displayed, to stop the moving picture. The point in time at which the OK button 582 is pressed is defined as "specified time T0." This specified time T0 is indicated as the time that would have elapsed, if the moving picture were played back in real-time, from the beginning of the playback until the OK button 582 was pressed.

Figure 7:
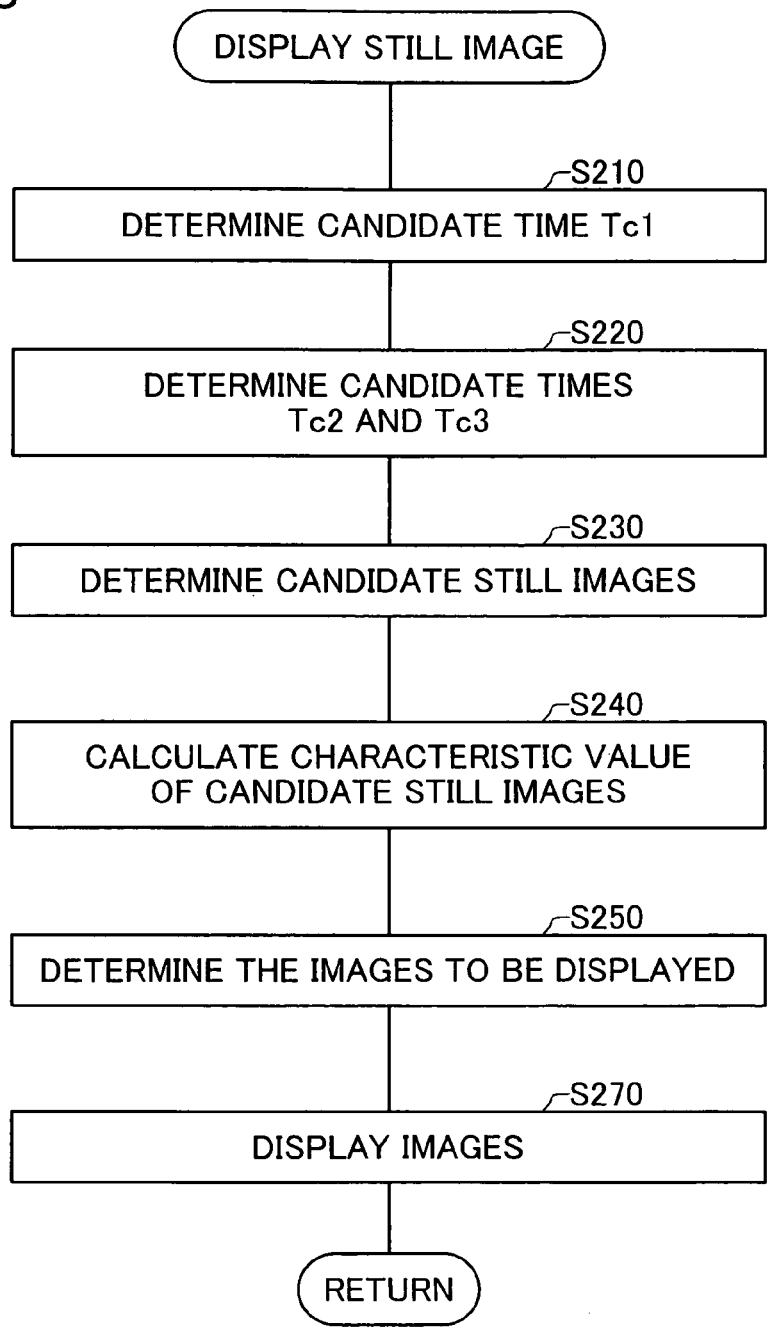
FIG. 7 is a flow chart illustrating the sequence when determining the still images Ic1, Ic2 and Ic3.

FIG. 7 is a flow chart illustrating the process by which the CPU 100 determines the still image that is displayed on the liquid crystal display 40 after the OK button 582 is pushed. The function that stops the moving picture, according to the user specification, and displays a still image is achieved by the confirmation still image display unit 120 as a functional unit of the CPU 100. The confirmation still image display unit 120 is shown in FIG. 1.

In step S210 in FIG. 7, the CPU 100 of the printer first determines, as the first candidate time Tc1, the specified time P0 at which the OK button 582 was pressed (See the middle of FIG. 4). Next, in step S220, the CPU 100 determines the second and third candidate times Tc2 and Tc3. The second candidate time Tc2 is a time that is moved forward by a ΔTc=0.10 seconds from the first candidate time Tc1. The third candidate time Tc3 is a time that is after the first candidate time Tc1 by ΔTc=0.10 seconds. The time interval between the second candidate time Tc2 and the third candidate time Tc3 is termed the candidate time interval P1. As described below, one of the still images Ic11, Ic12, or Ic13 is selected as the still image Icc to be displayed on the liquid crystal display 40 based on the image that is displayed in the candidate time interval P1. The candidate time interval P1 is a time interval that is shorter than the chapter Ch5 replay time Pc5 (time Ts5 through time Te5) (See FIG. 4).

In step S230, the CPU 100 acquires, as the candidate still images Ic11, Ic12, and Ic13, the images displayed in the moving picture Mv at the first through third candidate times Tc1, Tc2, and Tc3, based on the moving picture data file (See the top of FIG. 4). Note that the function that generates the candidate still images is achieved by the candidate still image generating unit 122 as a functional unit of the CPU 100. The candidate still image generating unit 122 is shown in FIG. 1. The candidate still image generating unit 122 is a part of the confirmation still image display unit 120, which is, similarly, a functional unit.

In step S240 of FIG. 7, the CPU 100 calculates the characteristic values for the sharpnesses of the candidate still images Ic11, Ic12, and Ic13. Note that in FIG. 13 the diagonal lines drawn in the candidate still images Ic11 and Ic12 indicate that the edges in each of the images are blurred. When the object that is photographed is moving quickly, or when the camera has moved, then there will be blurring of the edges in each of the images in this way, resulting in decreased sharpness.

Figure 8:
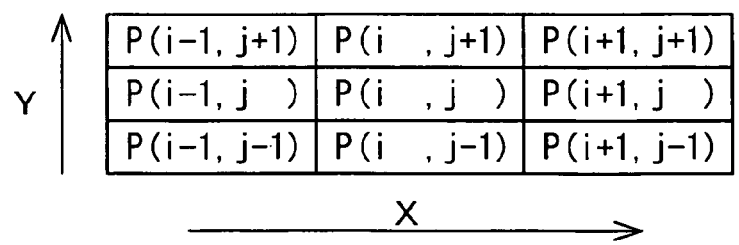
FIG. 8 is a diagram illustrating the calculating method for the characteristic value for the sharpness of the image.

FIG. 8 is a diagram illustrating the method of calculating the characteristic values for the sharpnesses of the images. As the characteristic value for the sharpness of an image, the average value of the amount of the edge at various pixel positions within the still image can be used. The "amount of edge" is a value that indicates the magnitude of the change in the brightness value at the pixel position. The difference in the brightness value between each of the pixels in the vicinity of the pixel position can be used as the amount of edge at the pixel position. A variety of methods can be used as the method for calculating this difference; for example, the Prewitt operator can be used. In FIG. 8, a plurality of pixels are disposed in the X-axial direction and in the Y-axial direction perpendicular thereto, and P(i, j) indicate the brightness value for the pixel that is the ith along the X axis and the jth along the Y axis. In this case, the formula for calculating the amount of edge E (i, j) at the pixel position (i, j) using the Prewitt operator is the formula shown below:

$$\Delta fx = [P(i+1, j+1) - P(i-1, j+1)] + \\ [P(i+1, j) - P(i-1, j)] + \\ [P(i+1, j-1) - P(i-1, j-1)]$$

$$\Delta fy = [P(i-1, j-1) - P(i-1, j+1)] + \\ [P(i, j-1) - P(i, j+1)] + \\ [P(i+1, j-1) - P(i+1, j+1)]$$

$$E(i, j) = \sqrt{\Delta fx^2 + \Delta fy^2}$$

[Equation 1]

The function that calculates the characteristic values for the sharpnesses in above mentioned way is achieved by a characteristic value calculating unit 124, as a functional unit of the CPU 100. The characteristic value calculating unit 124 is shown in FIG. 1. The characteristic value calculating unit 124 is similarly one part of the confirmation still image display unit 120, which is similarly a functional unit.

In case where the image data is expressed in a color space that does not include a brightness value as a parameter, for example, if expressed using the RGB color space, then the brightness values for each of the pixel positions can be produced by converting the color space into a color space that includes the brightness value as a parameter, such as the HSL color space or the YCbCr color space.

In step S250 in FIG. 7, the still image Icc to be displayed on the liquid crystal display 40 is determined based on the characteristic values of the sharpnesses in each of the candidate still images Ic11, Ic12, and Ic13. Specifically, the average values of the amounts of edge at each pixel positions in the candidate still images Ic11, Ic12, and Ic13 are compared. The candidate still image with the largest value is selected as the still image Icc to be displayed on the liquid crystal display 40. Here the candidate still image Ic13 is selected as the still image Icc. In FIG. 4, the candidate still image Ic13 is shown surrounded by the double line. This type of function for determining the still image to be displayed on the liquid crystal display 40 based on characteristic values is achieved by the still image determining unit 126 as a functional unit of the CPU 100. This still image determining unit 126 is shown in FIG. 1. The still image determining unit 126 is, similarly, a part of the confirmation still image display unit 120, which is a functional unit.

Figure 9:
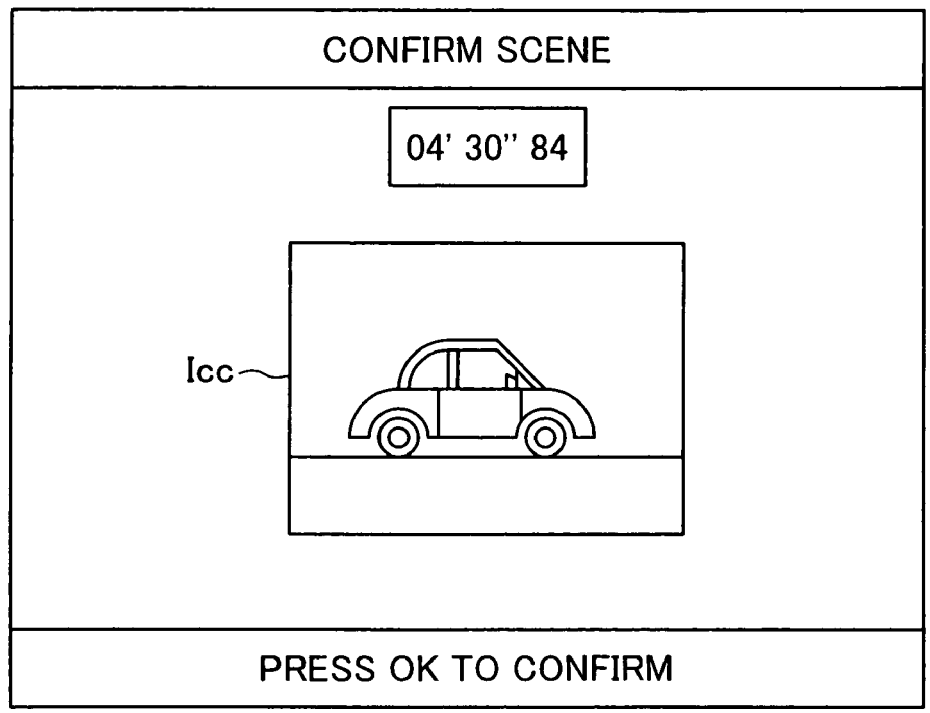
FIG. 9 is a diagram illustrating the display for the user to confirm an image that is selected by the user.

FIG. 9 is a diagram illustrating a display for the user to confirm an image that is selected by the user. When the still image Icc has been determined, the CPU 100 displays the still image Icc onto the liquid crystal display 40 in step S270 of FIG. 7 (See also FIG. 9.) Then the process for displaying the still image is over.

Such a configuration makes it possible to display, on the liquid crystal display 40, an image wherein there are clear edges, as the still image Icc, by eliminating in advance the images wherein the edges are blurred, and thus inappropriate for printing. This enables the user to print images with clear edges easily.

In step S270 in FIG. 7, the still image Icc is displayed larger than each of the representative still images Ich1 through Ich9, displayed in step S134, on the liquid crystal display 40 (See FIG. 5 and FIG. 9). In other words, in step S270, the still image Icc is displayed on the liquid crystal display 40 using more pixels than in each of the representative still images Ich1 through Ich9, displayed in step S134. In the first embodiment, the still image Icc is displayed in the same size as the moving picture Mv (See FIG. 6).

In step S150 in FIG. 3, when the still image Icc is displayed on the liquid crystal display 40, the user determines whether or not to print the still image Icc. If the still image Icc will not be printed, then the BACK button 584 (FIG. 2) is pushed to return the process again to step S140. On the other hand, if the still image Icc is to be printed, then the user pushes the OK button 582. In the latter case, the process advances to step S200.

In step S200 the printing of the still image Icc is performed. Note that the printing of the still image Icc can be performed with the number of pixels reduced from or increased from the number of pixels in the moving picture recorded in the moving picture data file. Moreover, while in the embodiment the explanation is omitted, the degree to which the number of pixels in the image is increased or decreased can be set after being specified by the user. Once printing has been completed, this process is complete. Note that the function that performs printing in this way is achieved by the printing unit 130, as a functional unit of the CPU 100. The printing unit 130 is shown in FIG. 1.

When printing by specifying a particular image from the moving picture, it is necessary for the user to play the moving picture in order to confirm the content of the moving picture. Playing the moving picture requires a certain amount of time. However, in the configuration such as in the first embodiment, it is possible to select the desired image quickly and easily from the moving picture because only the portion of the moving picture that is in the chapter selected by the user is played back (See FIG. 4). For example, if, as in the first embodiment, one moving picture is divided into nine chapters, then the time required for playing back the moving picture is ninth part.

In the first embodiment, when initially and roughly selecting the time interval (chapter) for playing back the moving picture, a plurality of still images corresponding to each of the chapters are displayed onto the display unit, and the user makes a selection (See steps S134 and S136 of FIG. 3 and see FIG. 5). At this stage the user may select a still image based on the rough composition, and thus this does not interfere with the selection even though the plurality of images on the display unit are displayed relatively small. After limiting the playback time for the moving picture to a specific time by selecting a chapter, a single moving picture is played in a larger size on the display unit, allowing the user to select the image for printing (See steps S140 and S150 in FIG. 3, and see FIG. 6). Consequently, when the user selects the image to be printed in the end, the user can select the image after confirming fine differences in the compositions of several images that are displayed in the moving picture. Thus the printing apparatus according to the first embodiment enables the user to specify the desired image quickly when specifying an image within a moving picture.

Moreover, in the first embodiment, the still images that are candidates for printing are displayed on the display unit after first eliminating the images with poor image quality because the edges are blurred (See the top of FIG. 4). Accordingly, it is possible to print high quality images quickly and easily by selecting and providing a high quality image to the user on the printer side, based on the image quality about which would be difficult for the user to confirm on a small display.

B. SECOND EMBODIMENT

In the first embodiment, the moving picture was divided into nine equal parts, chapters Ch1 through Ch9, according to the time of playback (See FIG. 3, step S132). However, in the second embodiment, the moving picture is divided in advance into chapters that have specific playback times from the beginning the moving picture. Then, nine still images corresponding to each of these chapters are displayed simultaneously on the liquid crystal display 40. The other points regarding the second embodiment are the same as in the first embodiment.

Figure 10:
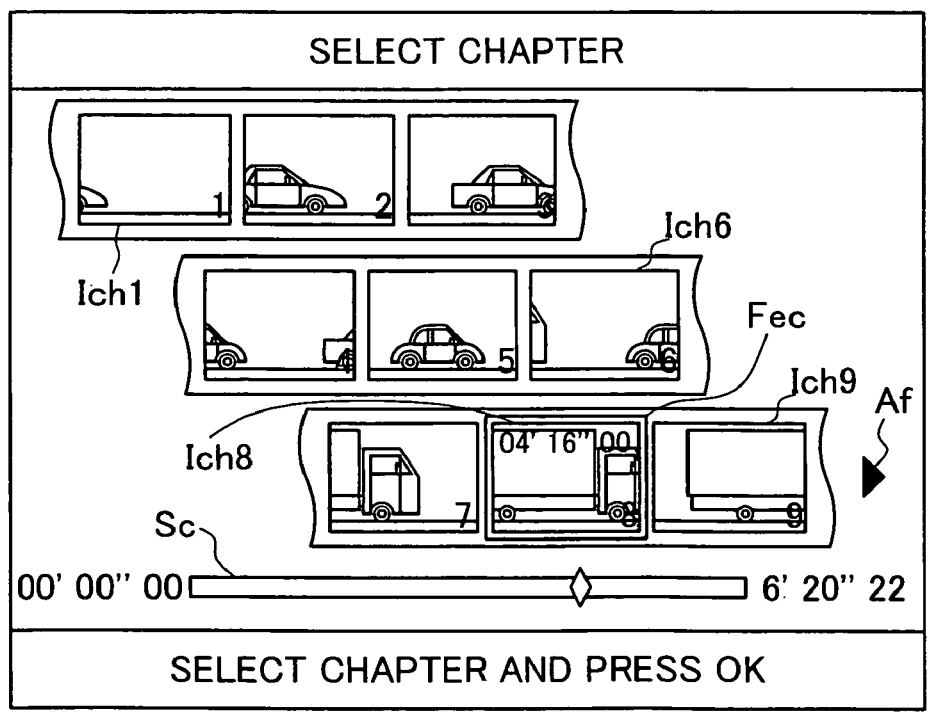
FIG. 10 is a diagram illustrating the display on the liquid crystal display 40 when still images are displayed corresponding to first through ninth chapters Ch1 through Ch9.

FIG. 10 shows the display unit in the liquid crystal display 40 when the still images corresponding to the first through 9th chapters Ch1 through Ch9 are displayed. In the second embodiment, the playback time is set for each chapter of the moving picture to a time such as 32.00 seconds. Here the moving picture in question has a playback time of 6 minutes and 20.22 seconds. This moving picture is divided into 12 chapters, each having playback times of 32 seconds.

After the chapter has been set, the CPU 100 first displays representative still images Ich1 through Ich9 on the liquid crystal display 40, as shown in FIG. 10, based on the images that are displayed first in the chapters Ch1 through Ch9. The existence of other chapters after the chapters for which corresponding still images are displayed (chapters Ich10 and following chapters) is indicated by the display unit of an arrow Af on the screen.

When, among the representative still images Ich1 through Ich9 there is an image that is near to the image that the user desires to print, the user operates the set of select button 586 to select that still image on the screen on the liquid crystal display 40, shown in FIG. 10. Then, the chapter corresponding to the selected still image is played back. The operations thereafter are the same as step S140 and following steps in the first embodiment.

On the other hand, if, among the representative still images Ich1 through Ich9, there are not images that are near to the image which the user wishes to print, then the user operates the downward-facing or right-facing button of the set of select buttons 586, from a state that the 9th chapter Ich9 is selected. Then the CPU 100 displays, on the liquid crystal display 40, still images for the 10th chapter and following chapters.

Figure 11:
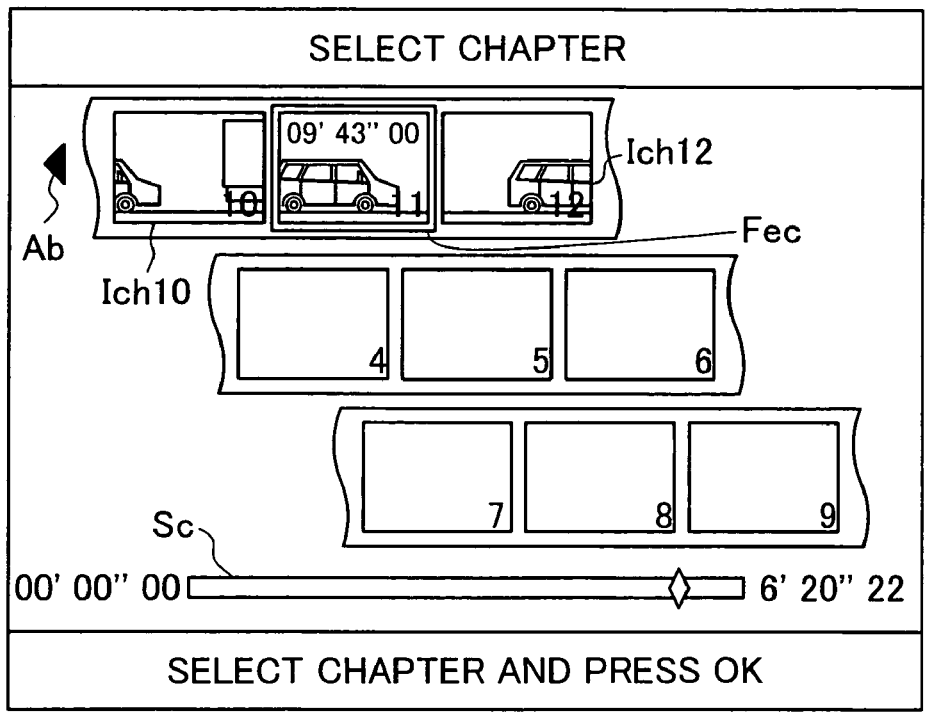
FIG. 11 is a diagram illustrating the display on a liquid crystal display 40 that displays representative still images Ich10 through Ich12, corresponding to tenth through twelfth chapters Ch10 through Ch12.

FIG. 11 is a diagram illustrating a liquid crystal display 40 that displays representative still images Ich10 through Ich12, corresponding to the 10th through 12th chapters Ch10 through CH12. If there is an image that is near to the image the user wishes to print among the representative still images Ich10 through Ich12, which are displayed on the liquid crystal display 40, then the user operates the set of select buttons 586 to select that still image. The operation thereafter is the same as in steps 140 and following steps in the first embodiment.

On the other hand, when the user operates the upward-facing or left-facing button of the set of select buttons 586, after the 10th chapter Ich9 has been selected, then the still images for Chapter 9 and before are displayed on the liquid crystal display 40 (See FIG. 10). The user is able to switch the representative still images that are displayed on the screen in this way, to select the chapter to be played back. Note that in the screen in FIG. 11 there is an arrow Ab that indicates the existence of preceding chapters prior to the chapters for which the corresponding still images are displayed.

This type of configuration makes it possible to setup chapters, such that each of the chapters has equal playback times, even for moving pictures wherein the total playback time is not known. Moreover, in case where receiving the moving picture data via a communications circuit, it is possible to set up chapters sequentially starting from the beginning, and to display still images while receiving the data. Moreover, it is possible to display representative still images for each specific time period, regardless of the length of the playback time of the moving picture. Accordingly, even when the playback time of the moving picture is long, it is possible to prevent a situation wherein the image desired by the user is not displayed because the display time interval between the representative still images is too long.

C. THIRD EMBODIMENT

In the first embodiment, a still image Icc was displayed in the same size as the moving picture Mv when the user stopped the moving picture Mv (See step S150 in FIG. 3, and FIG. 6 and FIG. 9). In the third embodiment, when the user stops the moving picture, a plurality of still images Ic1 to Ic3 are displayed, where the images are larger than each of the representative still images Ich1 to Ich9 that are displayed when making chapter selections (see FIG. 5), but smaller than the moving picture Mv. The user selects the image to be printed from among the still images Ic1 to Ic3. The other points in the third embodiment are the same as in the first embodiment.

Figure 12:
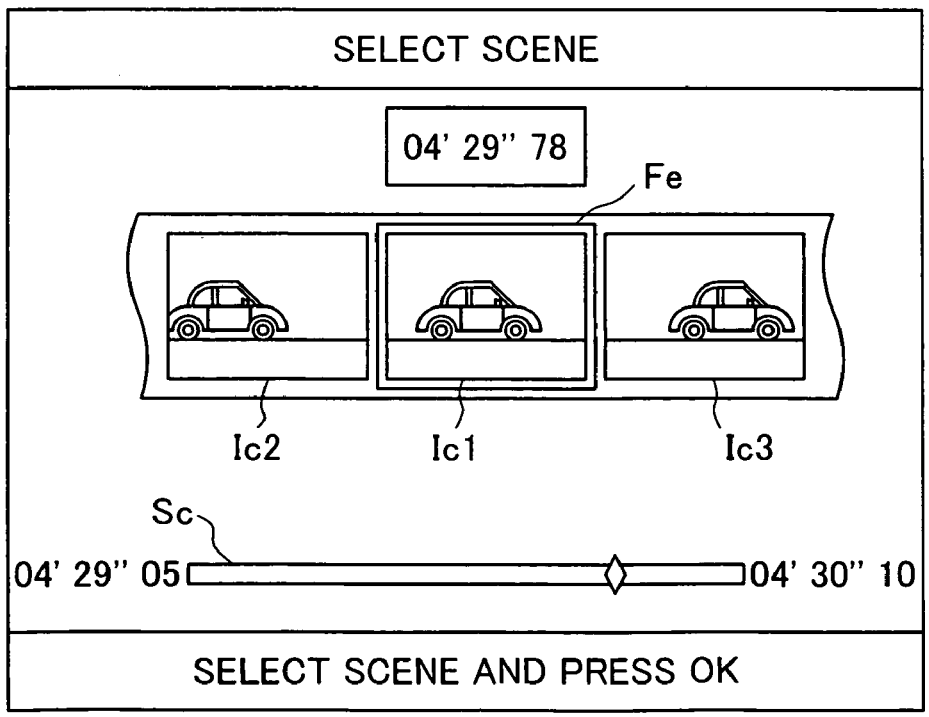
FIG. 12 is a diagram illustrating the screen that is displayed on the liquid crystal display 40 when an OK button 582 has been pressed in a step S150.

FIG. 12 is a diagram illustrating the screen that is displayed on the liquid crystal display 40 after the moving picture Mv has been stopped in the third embodiment. In the third embodiment, after the moving picture Mv has been stopped in step S150 of FIG. 3, three still images Ic1, Ic2, and Ic3 are displayed, as shown in the middle of FIG. 12. Moreover, as shown at the top of FIG. 12, the specified time T0, the time at which the user pressed the OK button 582 during the playback of the moving picture, is displayed on the liquid crystal display 40. Here the specified time T0 is 4 minutes and 29.78 seconds. Moreover, as shown at the bottom of FIG. 12, indicator on a time scale Sc is stopped at a position corresponding to the specified time T0 (4:29.78).

Figure 13:
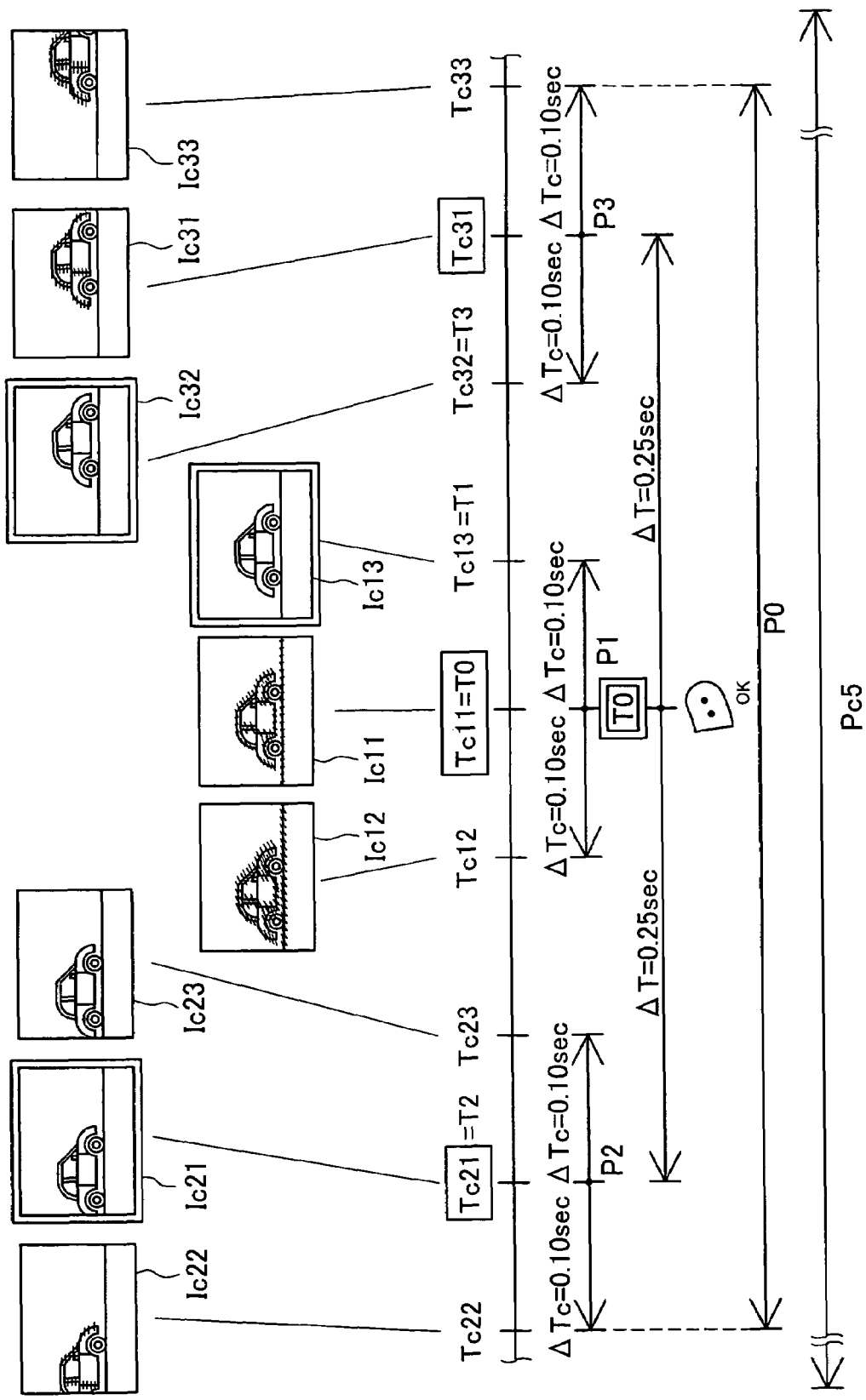
FIG. 13 is an explanatory diagram illustrating the processing when selecting the still images Ic1, Ic2, and Ic3.

FIG. 13 is an explanatory diagram illustrating the processing when selecting the still images Ic1, Ic2, and Ic3 displayed on the liquid crystal display 40. In the third embodiment, when the OK button 582 is pressed to stop the moving picture Mv, the CPU 100 determines candidate times Tc11, Tc21 and Tc31 within the chapter. The candidate time Tc11 is the specified time T0. The candidate time Tc21 is a time that proceeds the candidate time Tc11 by $\Delta T=0.25$. The candidate time Tc31 is a time after the candidate time Tc11 by $\Delta T=0.25$.

After this, the CPU 100 determines still images Ic1, Ic2, and Ic3, corresponding to the respective candidate times Tc11, Tc21, and Tc31, as the first candidate time Tc1 (See step S210 of FIG. 7). The details of the process for setting the still image, after selecting the candidate time Tc1, Tc21, or Tc31 as the first candidate time Tc1, is the same as the details of the processes in steps S220 and S230 in the first embodiment (See FIG. 7). In FIG. 13, the still images Ic1, Ic2, and Ic3, corresponding to the candidate time Tc11, are shown as the still images Ic11, Ic12, and Ic13. The still images Ic1, Ic2, and Ic3 corresponding to the candidate time Tc21 are shown as the still images Ic21, Ic22, and Ic23. The still images Ic1, Ic2, and Ic3 corresponding to the candidate time Tc31 are shown as the still images Ic31, Ic32, and Ic33.

Moreover, the CPU 100 determines the still images Ic1, Ic2, and Ic3, corresponding to each of the candidate times Tc11, Tc21, and Tc31, based on the characteristic values of each of the still images, through processes that are the same as the processes in steps S240 and S250 in FIG. 7. Here the still image Ic13 is selected as the still image Ic1, the still image Ic21 is selected as the still image Ic2, and the still image Ic32 is selected as the still image Ic3. The selected images are shown enclosed by the double lines in FIG. 13. Then, the selected still images Ic1, Ic2, and Ic3 are displayed as shown in FIG. 12.

In the third embodiment, $\Delta Tc$ and $\Delta T$ have the relationship $\Delta Tc < (\Delta T/2)$. $\Delta T$ is the time interval between the candidate times Tc11 and Tc21, and also the time interval between Tc11 and Tc31 (See FIG. 13). $\Delta Tc$ is the time interval between candidate times Tci1 and Tci2 (where i=1, 2, 3), and also the time interval between candidate times Tci1 and Tci3. Because $\Delta Tc$ and $\Delta T$ have the relationship described above, the candidate times can be arranged in the order of the progression of time as follows: Tc22, Tc21, Tc23, Tc12, Tc11, Tc13, Tc32, Tc31, Tc33 (See FIG. 13). Accordingly, the sequence with which each of the images Ic1, Ic2, and Ic3 are shown in the moving picture is the same as the sequence of still images Ic1, Ic2, and Ic3, even when the respective candidate images are selected as still images Ic1, Ic2, and Ic3 for the three sets of candidate still images Ic11 through Ic13, Ic21 through Ic23, and Ic31 through Ic33.

When the still images Ic1, Ic2, and Ic3 are displayed (as in FIG. 12), the user operates the group of select buttons 586 to select the desired image from among the still images Ic1 through Ic3. Then, the OK button 582 is used to confirm. When this is done, the selected image is printed. Here the still image Ic1 is selected from among the still images Ic1, Ic2, and Ic3 is FIG. 12. The selected still image Ic1 is enclosed in the frame Fe in the screen in FIG. 12.

The times within the moving picture at which the still images Ic1, Ic2 and Ic3, shown in FIG. 12, are displayed, are defined as T1, T2, and T3 (See the middle of FIG. 13). Using the configuration in the third embodiment, the user is able to select and print the desired image from among the still images Ic1 through Ic3, at the time T2 (which is the time Tc21, Tc22, or Tc23) that is prior to the specified time T0 when the user pressed the OK button 582 during the playback of the moving picture, the time T3 (which is time Tc31, Tc32, or Tc33) which is after the specified time T0, or the time T1 (the time Tc11, Tc12, or Tc13), which is in that interval (See FIG. 13).

It is difficult for humans to remember accurately scenes that are displayed during the playback of a moving picture, and humans cannot know in advance the scenes that will be displayed later. Moreover, it is also difficult for humans to operate a button the instant that a desired scene has been played back. However, using the present embodiment, the user can select a still image from the scenes that are displayed at different times (T1, T2, and T3) from among a specific time interval P0 (Tc22 through Tc33) that includes the time specified by the user. Accordingly, the user is able to select and print a desired still image from the moving picture using simple operations, without having to repetitively start and stop the moving picture.

The display unit that is equipped on the printer device is typically small. When such a display is used to display a plurality of still images, the display of each of the still images will be small. Consequently, it is difficult to display several dozen still images on the small display, and difficult for the user to select from among those images the still image that will be printed in the end. In the present embodiment, a chapter of the moving picture is played back and the user specifies the time at which the desired image is displayed. When this is done, then a limited number of still images (in this case, 3) are displayed on the display based on the images that are displayed in the time interval P0 that is near to that time. As a result, the user is able to specify and print the desired image, using simple operations, even when a relatively small display is used.

As shown in FIG. 12, the still images Ic1 through Ic3 are displayed in the same order as the times at which they are displayed in the moving picture. Accordingly, the user is able to select the desired image after understanding the changes in composition of the still images intuitively.

Additionally, in the present embodiment, the still image Ic1 is an image that is selected from within the range of the specified time $T0 \pm \Delta Tc$, which includes the specified time T0, where the user has specified a scene. In other words, the still image Ic1 is the scene, from among the still images Ic1 to Ic3, that is displayed nearest to the specified time T0. Consequently, the user is able to select and print an image with a desired composition that most nearly meets the intention of the user from among the still image Ic1 and the still images Ic2 and Ic3, where these still images Ic2 and Ic3 are images that are displayed before and after the still image Ic1 in the moving picture. Accordingly, with the process described above, there is a high likelihood that the user will be able to print a desired image with little trial and error (see steps S140 through S170 in FIG. 3).

Furthermore, the candidate still images of the individual still images Ic1 through Ic3 are images that are displayed with intervals of 0.1 seconds, and the time interval $\Delta T$ between sets of candidate still images for the still images Ic1 through Ic3 is 0.25 seconds. Consequently, each of the still images Ic1 to Ic3 displayed on the liquid crystal display 40 are images that are displayed, in the moving picture, no less than a minimum of 0.05 seconds and no more than a maximum of 0.45 seconds apart from each other (See FIG. 13). Accordingly, using the printing apparatus according to the present embodiment, images can be specified as candidates with these images being relatively similar to each other in the vicinity of the specified time T0, which is specified by the user, whereas a plurality of images may be presented which are different enough so that the selection by the user will be significant.

D. MODIFICATIONS

The present invention is not limited to the embodiments or aspects described above, but rather can be embodied in a variety of aspects without deviating from the intent thereof, and, for example, can be modified as described below.

D1. Modification 1:

In the embodiments described above, all of the moving picture Mv and the still images Icc for confirmation were displayed more largely than each of the representative still images Ich1 through Ich9, which are displayed when a chapter is selected (See FIG. 5, FIG. 6, and FIG. 9). That is, the playback of the moving picture Mv (in FIG. 6) and the display of the confirmation screen for the selected still image Icc (in FIG. 9) were displayed with a reduction of the same ratio, from the number of pixels in the moving picture that is stored in the moving picture data file on the memory card.

However, the reduction ratios may be different when playing the moving picture Mv and displaying the confirmation screen for the still image Icc that is selected. Moreover, instead only one of these, either the moving picture Mv or the still image Icc for confirmation, may be displayed more largely than each of the still images that are displayed when selecting a chapter. The moving picture Mv and the still image Icc for confirmation may be displayed at the same size as each of the still images that are displayed when selecting a chapter, or may even be displayed smaller than each of the still images that are displayed when selecting a chapter. However, preferable the moving picture Mv is played more largely than each of the still images that are displayed when selecting a chapter, or, in other words, should be displayed using a larger number of pixels. Such a configuration makes it possible to select an image to be printed by the user confirming fine difference between images.

Furthermore, preferably the still image Icc for confirmation is displayed even more largely than the moving picture Mv. Such a configuration makes it possible for the user to perform the printing after confirming the details of the image to be printed based on the still image Icc. The load on the CPU for displaying still images is small comparing to the load for playing moving pictures. Consequently, it is possible to reduce the load on the CPU by having the playback of the moving picture Mv be smaller than the display of the still image Icc for confirmation. While, on the other hand, having the still image Icc for confirmation be displayed larger than the moving picture Mv enables the user to select the image easily.

In the third embodiment, the three still images Ic1, Ic2, and Ic3 were displayed smaller than the moving picture Mv. However, each of the still images Ic1, Ic2, and Ic3 may be displayed at the same size as the moving picture Mv. For example, a configuration is possible wherein the paused moving picture Mv is displayed as the still image Ic1, and still images Ic2 and Ic3 are displayed on both sides thereof.

D2. Modification 2:

In the first embodiment the images Ichi, corresponding to each of the chapters, were each the images that are displayed at the beginning of each of the chapters (See FIG. 4). However, the relationship between each of the chapters and the corresponding images Ichi may be a different relationship instead. That is, the corresponding images Ichi may be images that are displayed in the middle of the playback times of each of the chapters. Moreover, the corresponding images Ichi may instead be images that are displayed at times that are one quarter or one fifth of the way from the beginning of the playback time in each of the chapters. That is, each of the chapters should have a playback time that is shorter than the playback time of the entire moving picture, and should include the time at which the corresponding still image is displayed within the moving picture.

D3. Modification 3:

In the first embodiment, the playback of the moving picture Mv in step S140 of FIG. 3 is performed in real-time. However, the payback of the moving picture Mv in step S140 may instead be performed at a pace that is slower than real-time. Such as configuration increases the probability that it will be possible to avoid a situation wherein the image that is displayed on the liquid crystal display 40, when the moving picture is paused, is already an image aside from the desired image, even though the user has pushed the OK button 582 immediately after seeing the desired scene.

In the first embodiment the specified time T0, which is the reference when determining the time interval P1 for selecting the images that are displayed, was the time at which the OK button 582 was pressed. However, instead the time interval P1 for selecting the image to be displayed may be determined based on a time that is prior, by a specific time interval, to the time at which the OK button 582 was pressed. For example, the time interval for selecting the images to be displayed may be determined using, as the reference, a time that is earlier than the "time at which the button operation is sensed by the system" by a "average reaction time dt required by a human to complete a button operation after recognizing a desired image." That is, the time interval P1 for selecting the images to be displayed may be a time interval that has a specific relationship relative to the time at which the user provides the specification.

D4. Modification 4:

In the third embodiment, the user selected the image to be printed from three still images Ic1, Ic2, and Ic3, displayed on the liquid crystal display 40 (See FIG. 12). However, the number of still images displayed on the liquid crystal display 40 may be a different number. For example, there may be two still images displayed, or four or more still images, such as five or nine still images, displayed. Moreover, this number of still images displayed on the liquid crystal display 40 may be able to be changed according to an input by the user.

In the case of displaying two still images, it is preferable that these still images are still images that are displayed, respectively, in a time interval that includes the time at which the user issued the specification during playback of the moving picture, and a time interval that includes a time prior to that time. Moreover, preferably these time intervals are mutually exclusive.

On the other hand, when an odd number of still images is displayed, it is preferable that the displayed images include an image that is displayed at a time nearest to the time T0 at which the user has issued the specification during the playback of the moving picture, an image that is displayed at a time that is earlier than this time T0, and an image that is displayed later than this time T0 should be included. Furthermore, preferably the image that is displayed at the earlier time and the image that is displayed at the later time should be displayed simultaneously.

Preferably the plurality of candidate images that are displayed on the display include more images that are displayed earlier than the specification time T0 than the images that are displayed later than the specification time T0. There is a time difference (the reaction time) from the user seeing the desired scene within the moving picture and the moving picture being paused by the pressing of the button. In many cases the desired scene will have been displayed prior to the specified time T0. Consequently, a configuration described above enables the printing of a scene that the user feels desirable with less trial and error.

D5. Modification 5:

In the third embodiment, candidate still images Ic21 through Ic23 and Ic31 through Ic33 were determined centered on times (Tc21 and Tc31 in FIG. 13) that were 0.25 seconds before and after the specified time T0 at which the OK button 582 was pressed (See FIG. 13). However, the time interval ΔT may be a different value instead. The time interval ΔT is preferably between, for example, 0.15 and 0.35 seconds, and more preferably between 0.20 and 0.30 seconds.

Moreover, the time interval ΔT is even more preferably between 0.23 and 0.27 seconds.

The time interval ΔT may be able to be modified according to an input from the user. The time interval ΔT may be inputted as a specific number of seconds, or may be inputted through the selection from a menu such as "LARGE," "MEDIUM," and "SMALL." Furthermore, instead the input may be through the operation of a scale that is displayed on the screen. In other words, the printer may be able to receive the input of a specification for the time interval ΔT by the user in some form.

Using this type of configuration, the user is able to set a desired value for the time interval ΔT to be used as the basis when generating the still images. For example, a user who is concerned about fine changes in the composition can set a small value for the time interval ΔT, to be able to select the desired image from among images that are only slightly different from each other. When printing based on a moving picture wherein a subject moving quickly was recorded, the user can set this time interval ΔT to a small value to make it easier to select an image with the desired composition. Conversely, when printing based on a moving picture wherein a subject moving slowly was recorded, the user can set the time interval ΔT to a large value to make it possible to select easily an image with the desired composition from among images wherein there is a significant difference in composition.

Moreover, in the third embodiment, the image to be printed was selected from among a still image Ic1 that is a still image displayed at a time nearest to the specification time T0 at which the user specified the scene within the moving picture, and still images Ic2 and Ic3 which are displayed there before and thereafter in the moving picture. However, the candidate for the images to be printed may also be selected from scenes that are displayed at other times. In other words, the configuration may be such that the image to be printed is selected from among candidate images that include a still image that is displayed at a time T3 that is nearest to the specified time T0, and a plurality of images that are displayed at times T1, T2, and so forth, prior thereto. However, preferably the candidate images include also an image that would be displayed after the specified time T0.

Moreover, in the third embodiment the time intervals for the times Tc11, Tc21, and Tc31, centered on each of the time intervals P1, P2, and P3, were determined based on the time interval ΔT specified by the user (See FIG. 13). However, the durations of these time intervals may be determined through a different process. For example, the time interval between each of the times that are nearest to each of the time intervals (for example, the time intervals between times Tc23 and Tc12, or the intervals between times Tc13 and Tc32 in FIG. 13) may be determined based on a specification by the user. That is, the printer may be configured so as to receive a specification from the user and then to set the gaps between the time intervals in some way.

In the third embodiment, the candidate times Tc22, Tc21, Tc23, Tc12, Tc11, Tc13, Tc32, Tc31 and Tc33 were all times within the playback interval for the chapter Ch5 that was selected (See FIG. 13). However, the candidate times may instead be times that are outside of the playback time for the selected chapter within the moving picture. For example, TC22 may be a time that is included in the playback time of chapter Ch4, and Tc33 may be a time that is included within the playback time of the chapter Ch6.

In the first and third embodiments, the time interval ΔTc between the images Ici1 through Ici3 (where i=1, 2, or 3), which serve as the candidates when selecting the images to be displayed on the display unit, was specified as an absolute value (0.1 seconds) (See FIG. 3). However, this time interval $\Delta Tc$ may instead be determined as a specific ratio relative to the time interval $\Delta T$. For example, $\Delta Tc$ should be between 0.2 and 0.4 times $\Delta T$. Given this type of configuration, the sequence in which the images Ic1, Ic2, and Ic3 are displayed in the moving picture will not be out of sequence even when the time interval $\Delta T$ is changed by the user.

D6. Modification 6:

In the first embodiment, the characteristic value for the image quality, which served as the basis when selecting the images to be displayed on the display unit, was a characteristic value for sharpness. Moreover, the characteristic value for sharpness was, specifically, the average value of the amount of edge in all of the pixels included in the image. However, other values may be used as the characteristic value for sharpness. That is, the characteristic value may be calculated based on a specific parameter of a collection of pixels including the pixels in the center of the image by excluding the pixels near to the edges of the image. Moreover, the characteristic value may instead be determined based on the amount of edge in a partial sampling of pixels from among all of the pixels included in the image. Furthermore, the characteristic value may instead be a value obtained through calculating an average of parameters such as the amount of edge, through weighting depending on the position of the pixel within the image.

Moreover, the proportion of the edge pixel relative to the total number of pixels may instead be used as the characteristic value regarding the sharpness of the image. Here the "edge pixels" refers to the pixels wherein the amount of edge at the pixel position is greater than or equal to a specific edge threshold. Here the "edge threshold" can use a value that is determined based on a subjective evaluation of image output results. For example, if the range that can be assumed for brightness is 0 through 255, then 40 may be used as the edge threshold value.

The proportion of the edge pixels determined in this way will tend to be smaller in blurry images and larger in sharp images. Consequently, by selecting images wherein the proportion of edge pixels is greater than or equal to a specific proportion threshold value makes it possible to exclude blurred images from being outputted. This "proportion threshold value" can use a value that is determined based on a subjective evaluation of the results of outputting images. For example, 20% of all pixels may be used as the specific ratio threshold value.

Moreover, when selecting, based on image quality, the images to be displayed on the display unit, the selection may instead be performed based on other values. For example, feature points in each of the candidate images may be extracted, and the images to be displayed on the display unit may be selected by selecting those images that have the greatest number of feature points. In this case where, there is a plurality of images with an equal number of feature points, then the images that are nearest to the specified time T0 should be selected.

D7. Modification 7:

In the first embodiment, the printer 1 was provided with a card slot 70 for inserting a memory card for reading the data there from. However, instead of a card slot 70, the printer may be provided with other means for receiving in moving picture data. For example, the printer 1 may be provided with a communications unit that can receive moving picture data from the outside though a wired or wireless communications circuit.

Moreover, in the first embodiment, the printer 1 was provided with a switch wherein the method of inputting data can be changed by pressing the switch. However, the printer 1 may be provided with a different method of switching. For example, the configuration may instead be one wherein a rotational switch for switching the display on the display unit 40 is provided, and wherein there is a specific switch for advancing to the next process after the content of the display has been confirmed. That is, the printing apparatus may be provided with a switch whereby the user can specify that the moving picture be paused, and a switch that assists the input, at lest partially, when inputting the specification of the still image.

In the first embodiment, the printer 1 was provided with a 2.5-inch liquid crystal display 40. However, the image display means provided on the printer may be in a different form. For example, the image display means may be an EL display (electroluminescent display). That is, the image display device provided in the printer need only be able to display still images and moving pictures. Moreover, in terms of the size of the display unit, 1 to 5 inches is well suited for provision on a printer. Note that when the desires by the user for both readability and for printer miniaturization are taken into account, display sizes between 2 and 4 inches are even more suitable.

D8. Modification 8

In the first embodiment, a time scale Sc was displayed with the start time Tsi and the end time Tei of the selected chapter on both ends thereof, where this time scale was displayed at the bottom of the screen in the liquid crystal display 40 when the moving picture was played back in step S140 in FIG. 3 (See FIG. 6). However, the display of the screen on the liquid crystal display 40 when the moving picture is played back in step S140 may have a different configuration.

Figure 14:
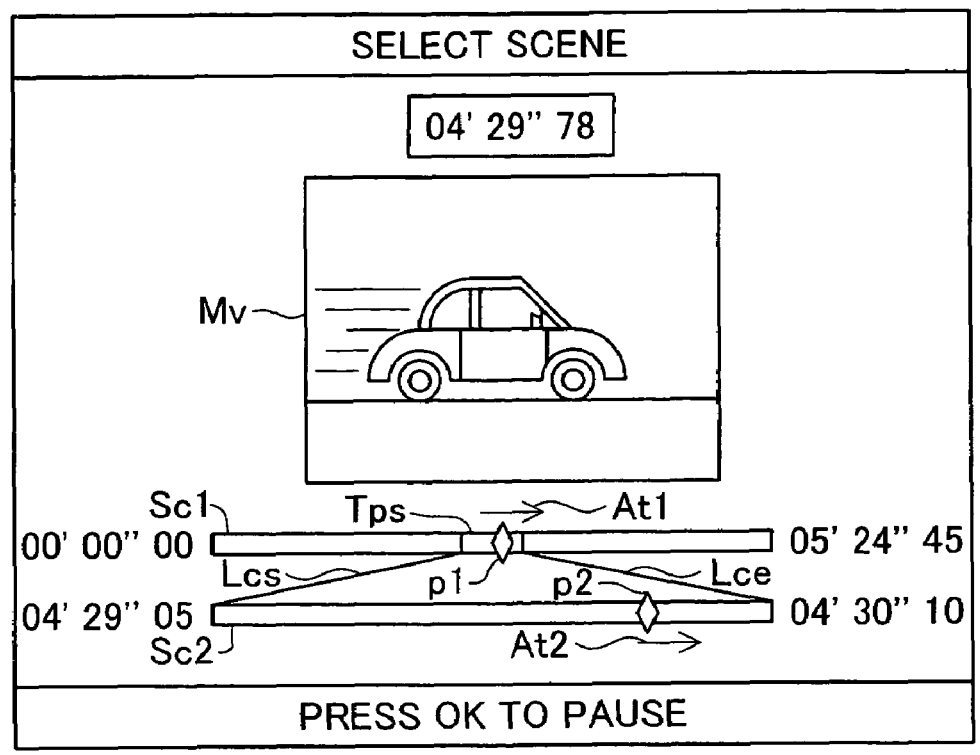
FIG. 14 is a diagram illustrating the state wherein a moving picture is played back on the liquid crystal display 40 in step S140 of FIG. 3.

FIG. 14 is a diagram illustrating the state wherein the moving picture is displayed on the liquid crystal display 40 in step S140 of FIG. 3. Time scales Sc1 and Sc2 are displayed at the bottom of FIG. 14. The time scale Sc1 is a time scale that has, on the ends thereof, the start time Ts0 (0 minutes and 0.00 seconds) and the end time Te0 (5 minutes and 24.45 seconds) for the entire moving picture. The time scale Sc2 has, on the ends thereof, the start time Tsi (4 minutes and 29.05 seconds) and the end time Tei (4 minutes and 30.10 seconds) of the selected chapter.

The time scale Sc1 shows a time interval display Tps corresponding to the selected chapter Ch5. The time interval displayed Tps shows a time interval that has, on the ends thereof, the start time Tsi (4 minutes and 29.05 seconds) and the end time Tei (4 minutes and 30.10 seconds) of the selected chapter in the time scale Sc1.

The left edge of the time interval display Tps, and the left edge of the time scale Sc2, both show the start time Tsi of the selected chapter. An indicator Lcs, that is a line that establishes the correspondence between the left edge of the time interval display Tps and the time scale Sc2 is shown on the screen. In addition, the end time Tei of the selected chapter is shown at both the right edge of the time interval display Tps and the right edge of the time scale Sc2. An indicator Lce, that is a line that establishes the correspondence between the right edge of the time interval display Tps and the right edge of the time scale Sc2, is displayed on the screen. Note that these indicators Lcs and Lce can be other indicators, such as dotted lines or dashed lines, or can be omitted.

An indicator p1 on the timescale Sc1 moves from the left to the right on the time interval display Tps of the time scale Sc1, as shown by the arrow At1, as the moving picture Mv is played back. On the other hand, the indicator p2 of the time scale Sc2 moves from left to right on the time scale Sc2, as shown by the arrow At2, and the moving picture Mv is played back. The other features of the constitution of the 8th Modification are the same as in the first embodiment. The functions that play this type of moving picture are achieved by a movie playback unit 110, as a functional unit of the CPU 100 (See FIG. 1).

With this type of configuration, the user is able to grasp intuitively where, in terms of time, the scene currently displayed is in the chapter that is selected, based on the display of the time scale Sc2. Moreover, the user is able to grasp intuitively, where, in terms of time, the scene currently displayed is in the entire moving picture, based on the time scale Sc1. Furthermore, the user is able to understand the following based on the indicators Lcs and Lce, which establish the correspondences with the time interval display Tps of the time scale Sc1 and the correspondence between the time scale Sc2 and the time interval display Tps. That is, the user can understand, instantly and intuitively, where the scene currently displayed is in the selected chapter and in the moving picture as a whole.

The configuration may instead be such that the time scale Sc2 and the indicators Lcs and Lce are not displayed in the screen display when the moving picture is played on the liquid crystal display 40 in Step S140 of FIG. 3. Even in this configuration, the user can tell intuitively, based on the display of the time scale Sc1 and the time interval display Tps, where the scene currently displayed is, in terms of time, within the moving picture as a whole.

D9. Modification 9

A portion of the constitution achieved in hardware in embodiments described above may instead by replaced by software, and, conversely, a portion of the constitution achieved in software in the embodiments described above may instead be replaced by hardware. For example, a portion of the CPU functions can be executed in hardware circuitry.

A computer program by which to achieve these functions may be provided in a form that is recorded on a computer-readable recording medium, such as a floppy disk or a CD-ROM. The host computer reads out the computer program from the recording medium and sends the computer program to an internal memory device or to an external memory device. Conversely, instead the computer program may be provided to the host computer from a program supplying device through communications circuit. When the functions of the computer program are achieved, the computer program stored in the internal memory device is executed by the microprocessor of the host computer. Moreover, the computer program that is stored on the recording medium may be executed by the host computer directly instead.

In this specification, "host computer" is a concept that includes hardware devices and an operating system, meaning a hardware device that is operated under the control of an operating system. The computer program is caused to perform the functions of the various units described above on this type of host computer. Note that a portion of the functions described above may be achieved by the operating system rather than by an application program.

The Program product may be realized as many aspects. For example:

(i) Computer readable medium, for example the flexible disks, the optical disk, or the semiconductor memories;

(ii) Data signals, which comprise a computer program and are embodied inside a carrier wave;

(iii) Computer including the computer readable medium, for example the magnetic disks or the semiconductor memories; and (iv) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A printing apparatus for printing a still image based on a moving picture, comprising:
   a display unit which displays an image;
   a representative still image display unit which displays a plurality of first still images on the display unit based on a plurality of images which are to be displayed at mutually differing times in a single moving picture;
   a movie playback unit which receives from a user a selection of one first still image from among the plurality of first still images and plays back the moving picture on the display unit for a first time segment, wherein the first time segment is shorter than a playback time of the moving picture and includes a time at which the selected first still image is to be displayed, and wherein the movie playback unit plays the moving picture more largely than each of the first still images on the display unit;
   a confirmation still image display unit which displays, according to an instruction by the user which is given during the playback of the moving picture, a second still image on the display unit based on an image which is to be displayed in the moving picture; and
   a printing unit which prints the second still image,
   wherein the confirmation still image display unit;
   determines a first set of a plurality of candidate images which are each to be displayed in a second time segment which is shorter than the first time segment and includes an instruction time at which the instruction was given, and a second set of a plurality of candidate images which are each to be displayed in a third time segment which is shorter than the first time segment and includes a time prior to the instruction time;
   selects candidate images based on image quality from among the first set and second set of candidate images; and
   displays a plurality of still images which include a still image as the second still image based on the selected candidate images; and
   wherein the printing unit receives from the user a selection of one still image from among the plurality of still images and prints the one selected still image as the second still image.

2. A printing apparatus for printing a still image based on a moving picture, comprising:
   a display unit which displays an image;
   a representative still image display unit which displays a plurality of first still images on the display unit based on a plurality of images which are to be displayed at mutually differing times in a single moving picture;
   a movie playback unit which receives from a user a selection of one first still image from among the plurality of first still images and plays back the moving picture on the display unit for a first time segment, wherein the first time segment is shorter than a playback time of the moving picture and includes a time at which the selected first still image is to be displayed, and wherein the movie playback unit plays the moving picture more largely than each of the first still images on the display unit;

a confirmation still image display unit which displays, according to an instruction by the user which is given during the playback of the moving picture, a second still image on the display unit based on an image which is to be displayed in the moving picture; and a printing unit which prints the second still image, wherein the confirmation still image display unit;

determines a first set of a plurality of candidate images which are each to be displayed in a second time segment which is shorter than the first time segment and includes an instruction time at which the instruction was given, and a second set of a plurality of candidate images which are each to be displayed in a third time segment which is shorter than the first time segment and includes a time prior to the instruction time;

selects candidate images based on image quality from among the first set and second set of candidate images; and displays a plurality of still images which include a still image as the second still image based on the selected candidate images;

wherein the printing unit receives from the user a selection of one still image from among the plurality of still images and prints the one selected still image as the second still image; and wherein the confirmation still image display unit receives from the user a specification of a reference time interval and determines an interval between the second and third time segments based on the reference time interval.

3. A method of printing a still image based on a moving picture, comprising:

displaying a plurality of first still images on a display unit based on a plurality of images which are to be displayed at mutually differing times in a single moving picture;

receiving from a user a selection of one first still image from among the plurality of first still images and playing the moving picture on the display unit for a first time segment, wherein the first time segment is shorter than a playback time of the moving picture and includes a time at which the selected first still image is to be displayed, and wherein the playing of the moving picture includes playing the moving picture more largely than each of the first still images on the display unit;

according to an instruction by the user which is given during the playing of the moving picture, displaying a second still image on the display unit based on an image which is to be displayed in the moving picture; and printing the second still image, wherein the displaying of the second still image on the display unit includes determining a first set of a plurality of candidate images which are each to be displayed in a second time segment which is shorter than the first time segment and includes an instruction time at which the instruction was given, and a second set of a plurality of candidate images which are each to be displayed in a third time segment which is shorter than the first time segment and includes a time prior to the instruction time, selecting candidate images based on image quality from among the first set and second set of candidate images, and displaying a plurality of still images which include a still image as the second still image based on the selected candidate images, and wherein the printing of the second still image includes receiving from the user a selection of one still image from among the plurality of images, and printing the one selected still image as the second still image.

4. The method of claim 3, wherein the displaying of the second still image on the display unit further includes receiving from the user a specification of a reference time interval and determining an interval between the second and third time segments based on the reference time interval.

5. A computer program product for printing a still image based on a moving picture, comprising:

a computer-readable storage medium; and a computer program that is stored on the computer-readable storage medium; wherein the computer program includes:

a portion for displaying a plurality of first still images on a display unit based on a plurality of images which are to be displayed at mutually differing times in a single moving picture;

a portion for receiving from a user a selection of one first still image from among the plurality of first still images and playing the moving picture on the display unit for a first time segment, wherein the first time segment is shorter than a playback time of the moving picture and includes a time at which the selected first still image is to be displayed, and wherein the playing of the moving picture includes playing the moving picture more largely than each of the first still images on the display unit;

a portion for displaying, according to an instruction by the user which is given during the playing of the moving picture, a second still image on the display unit based on an image which is to be displayed in the moving picture; and a portion for printing the second still image, wherein the portion for displaying the second still image on the display unit includes a portion for determining a first set of a plurality of candidate images which are each to be displayed in a second time segment which is shorter than the first time segment and includes an instruction time at which the instruction was given, and a second set of a plurality of candidate images which are each to be displayed in a third time segment which is shorter than the first time segment and includes a time prior to the instruction time, a portion for selecting candidate images based on image quality from among the first set and second set of candidate images, and a portion for displaying a plurality of still images which include a still image as the second still image based on the selected candidate images, and wherein the portion for printing the second still image includes a portion for receiving from the user a selection of one still image from among the plurality of images, and a portion for printing the one selected still image as the second still image.

6. The computer program product of claim 5, wherein the portion for displaying the second still image on the display unit further includes a portion for receiving from the user a specification of a reference time interval and determining an interval between the second and third time segments based on the reference time interval.

* * * * *